J. P. HANSEN.
DARK ROOM LAMP.
APPLICATION FILED FEB. 6, 1919.
1,335,684.
Patented Mar. 30, 1920.
2 SHEETS—SHEET 1.
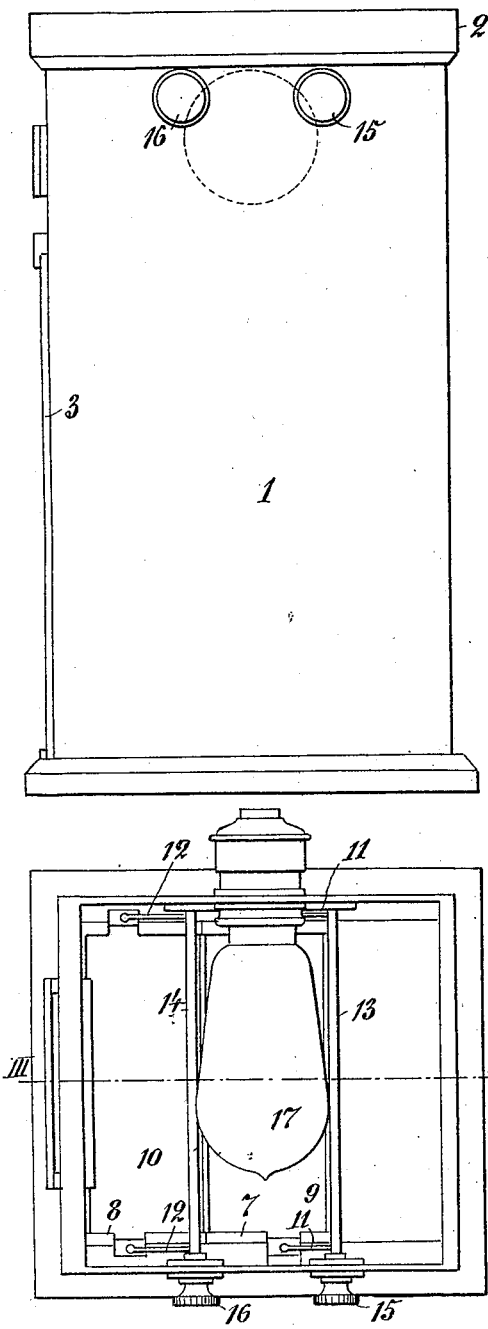
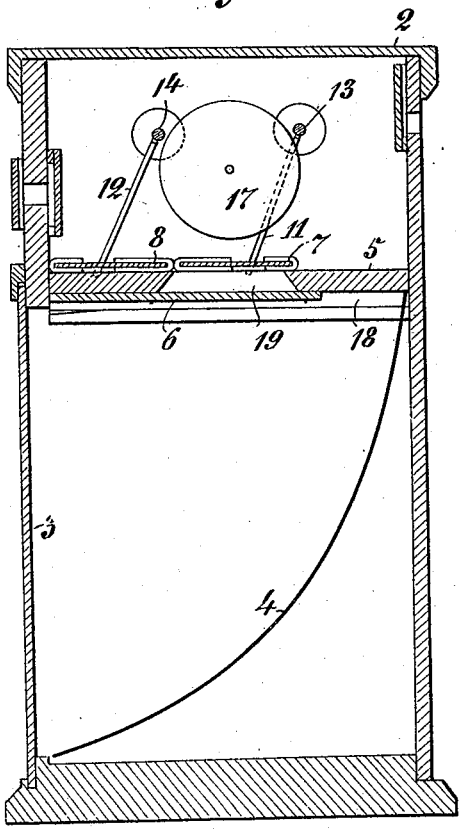
Inventor
JENS PETER HANSEN
By *Mmrlea*
Attorneys

J. P. HANSEN.
DARK ROOM LAMP.
APPLICATION FILED FEB. 6, 1919.

1,335,684.

Patented Mar. 30, 1920.
2 SHEETS—SHEET 2.

Inventor
JENS PETER HANSEN
BY
ATTORNEYS

UNITED STATES PATENT OFFICE.

JENS PETER HANSEN, OF COPENHAGEN, DENMARK.

DARK-ROOM LAMP.

1,335,684.

Specification of Letters Patent.  Patented Mar. 30, 1920.

Application filed February 6, 1919. Serial No. 275,441.

*To all whom it may concern:*

Be it known that I, JENS PETER HANSEN, residing at No. 10 Jacobys Allé, Copenhagen, Denmark, have invented certain new and useful Improvements in Dark-Room Lamps, of which the following is a specification.

The present invention concerns a dark room lamp, which also can be used as printing and retouching apparatus for photographic use.

The outstanding feature of the invention is partly, that the light rays are obliged to pass the colored glass or glasses before they pass the reflector, and partly, that the lamp, which gives an indirect light, very easily can be adjusted from giving light of one color to give light of another color, and that the colors can be mixed at will. The lamp can also be used for the printing of gaslight and bromid paper and the like, and for retouching of negatives and positives.

The invention is shown in a single form of execution, on the drawing, where:

Figure 1 is a side view of the lamp.

Fig. 2 is a top view of same, the cover being removed, and Fig. 3 is a vertical longitudinal section on the line III—III (Fig. 2).

Figure 4:
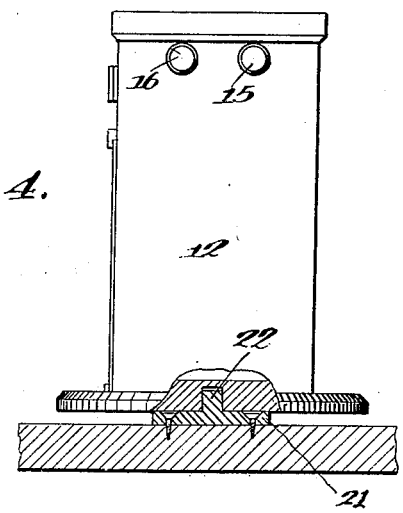
Fig. 4 is a side view partly in section of a modification.

On the drawing 1 is a square or round box or chamber with removable cover 2. On the front of the box is a large opening 3, which may be covered by a pane, within which opening is applied a reflector 4, which may be curved.

In the upper part of the box is a horizontal screen 5, of which the middle third part is cut out and covered by a pane of white, ground or milk glass. Below this pane is a groove 18, in which a pane of another color can be slidingly inserted. Above the screen 5 two slides, 7 and 8 properly guided can be displaced, of which one can contain red glass and the other yellow glass, marked 9 and 10 respectively.

The two frames are connected by arms 11 and 12 applied in pairs to the two shafts 13 and 14 turnably fitted in the upper part of the box, which shafts on the outside are provided with finger grips 15 and 16. Finally a light source 17 is applied above the screen 5.

The lamp acts as follows:

When the two slides 7 and 8, by means of the arms 11 and 12 and the shafts 13 and 14 have been displaced, so that they take up the position shown on Figs. 2 and 3, the light from the light source 17 will pass the red glass in the frame 7 and the milk glass 6 and reach the reflector 4, from which it will be reflected into the chamber.

By turning the shaft 13 against the hands of a clock the slide 7 will be displaced to the right, Fig. 3, and the rays will now only pass the milkglass.

When the slide 8 is displaced to the right the light will be made to pass the yellow glass 10.

If, for instance, the shaft 14 is turned, when the slides 7 and 8 are in the position shown in Fig. 3, both slides will at the same time be displaced to the right, it being thus possible to change from red light to yellow light, without getting white light between the two colors, likewise red can of course, be changed directly to yellow.

By an overlap on one or both of the glasses 9 and 10 at the place where they meet, and where the glasses otherwise only with difficulty could be made to join perfectly tightly by their edges, light-tightness can be secured so that white rays are avoided.

By placing the two glasses 9 and 10 beside each other above the opening 19 in the screen 5 the mixed colors will be produced, the different rays being dispersed and mixed by the pane 6 and the reflector 4.

When the lamp is used for printing gaslight or bromid paper or the like, the light sensitive material is placed in an ordinary printing frame while the lamp shows a light, which does not influence the material in question. Thereafter the printing frame is held before the opening 3, and the light is changed to white. When the exposure is finished, the light is changed to a relatively inactive color, whereupon the print is removed.

Figure 5:
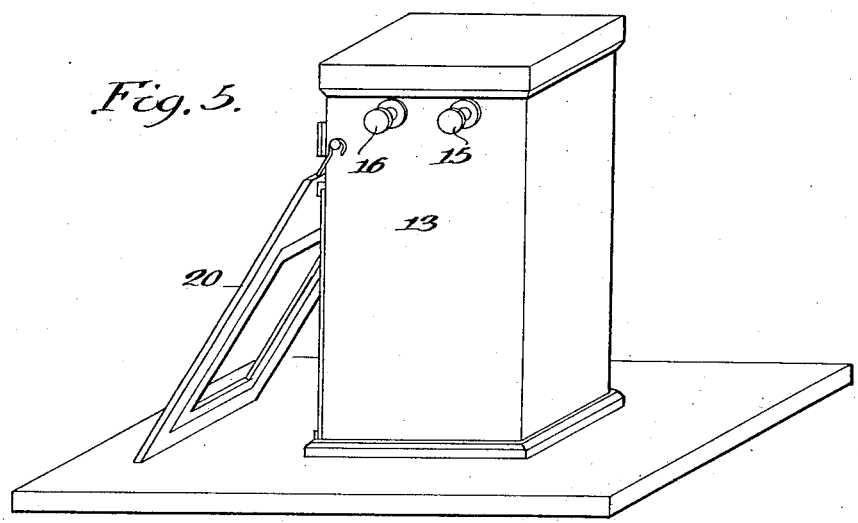
Fig. 5 is a perspective view of another modification.

The invention can also be used for a printing apparatus, and the reflector can then be removed and the printing frame placed in such manner, that it is directly exposed to the rays of light. Finally, the apparatus can be used for retouching, a retouching frame 20 being applied by suitable means to the box 1³ before or instead of the pane 3, as shown in Fig. 5, the white light will then form a very good and steady background for the negative.

The apparatus can be used standing, slanting, turnable or in lying position according to its purpose, the details being changed unessentially and accordingly.

It should be mentioned that it is not necessary to use two slides, a single slide being enough under certain circumstances, so that white can be changed to another, single color.

Neither is it necessary, that the slides should be placed and displaced as shown on the drawing, it being possible to apply and move the slides in other ways without deviating from the principle of the invention.

In the form of execution shown here the frames 7 and 8 consist of clamps, fastened in a springy way around the short edges of the glasses. In the clamps are holes for the arms 11 and 12, which are springy and which press the clamps against the edges of the glass.

Instead of the clamps, the glasses 9 and 10 may have holes for the arms 11 and 12.

The lamp may be placed on a small turntable 21 provided with a pivot 22, which coöperate with a hole in the bottom of the box 1³ of the lamp as shown in Fig. 4.

What I claim, and desire to secure by Letters Patent is:

1. A dark room lamp comprising a casing, a source of light in the casing, an apertured screen in the casing below the light, a glass below the opening of the screen, two different colored glasses above the screen and movable alternately over the opening of the screen, and a reflector in the lower portion of the casing and adapted to direct light through an opening in the casing.

2. A dark room lamp, comprising a casing, a source of light in the casing, an apertured screen below the light, a glass below the screen, two slides above the screen and each carrying a different colored glass, means for operating the slides, and whereby they may be moved alternately over the opening of the screen, or the opening left exposed and a reflector in the lower portion of the casing and adapted to direct light through an opening in the casing.

3. A dark room lamp, comprising a casing, a source of light in the casing, an apertured screen in the casing below the light, a glass below the screen, two slides above the screen and each carrying a different colored glass, shafts having means for operating them and provided with arms engaging the slides, and a reflector in the lower portion of the casing and adapted to direct light through an opening in the casing.

4. In a dark room lamp, a casing, an apertured screen, slides above the screen and each carrying a different colored glass, the slides being provided with openings, shafts above the slides, and spring arms carried by the shafts and engaging the openings of the slides.

5. In a dark room lamp, an apertured casing, an apertured screen, a glass below the screen, two different colored glasses above the screen, means for moving the different colored glasses alternately over the opening of the screen, a source of light above the different colored glasses, and a curved reflector in the lower portion of the casing.

6. In a dark room lamp, a casing having a panel in one side and provided with an apertured transverse screen and different colored glasses above the screen and movable alternately over the aperture thereof, and means for detachably securing a plate frame over the panel of the casing.

In testimony whereof I affix my signature in presence of two witnesses.

JENS PETER HANSEN.

Witnesses:
CHARLES HUDE,
E. STAUN.